Sept. 7, 1926.  K. DIENER  1,599,008
FIREARM
Filed Feb. 7, 1925
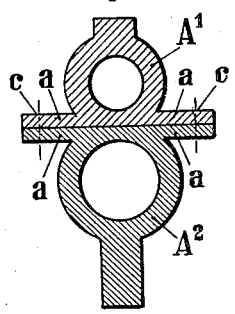
Fig.1.
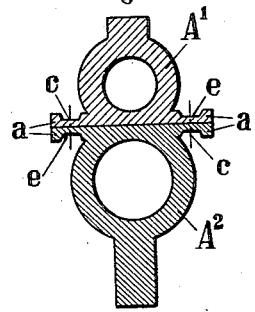
Fig.5.
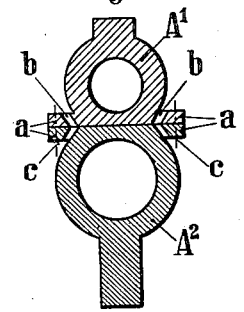
Fig.7.
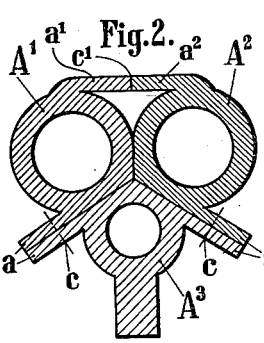
Fig.2.
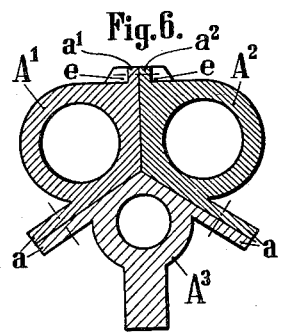
Fig.6.
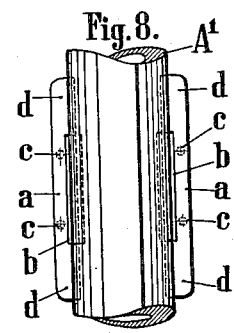
Fig.8.
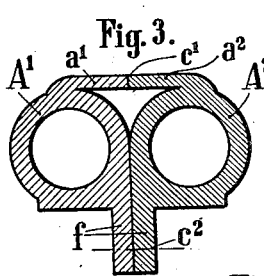
Fig.3.
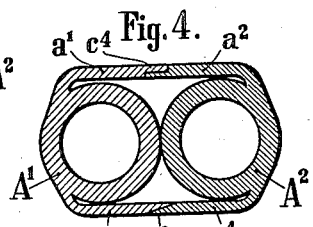
Fig.4.
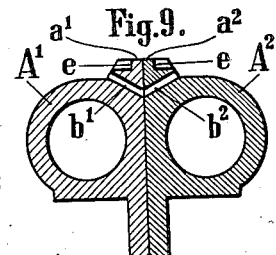
Fig.9.
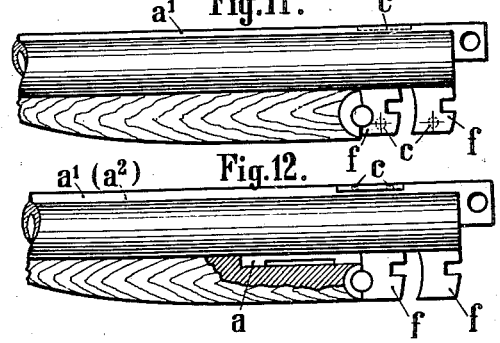
Fig.11.
Fig.12.
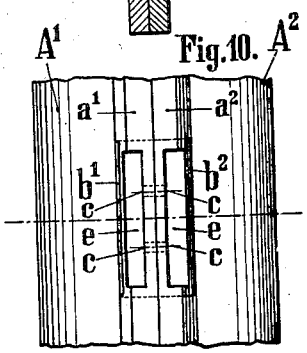
Fig.10.
Inventor:
Kurt Diener,
By Byrnes Townsend & Brickenstein,
Attorneys.

Patented Sept. 7, 1926.

1,599,008

UNITED STATES PATENT OFFICE.

KURT DIENER, OF GORKE, NEAR ANKLAM, GERMANY, ASSIGNOR TO N. V. UNION MAATSCHAPPIJ VOOR AUTOMATISCHE METAALBEWERKING, OF ROTTERDAM, NETHERLANDS.

FIREARM.

Application filed February 7, 1925, Serial No. 7,530, and in Germany February 25, 1924.

The sensitiveness of refined gun-barrel steels to subsequent heating has led to many attempts to effect the connection between the barrels of fire-arms with several barrels, by mechanical means (such as "chamber pieces," wedges, alternately milled lugs, recesses, grooves etc.) instead of by brazing. None of these constructions have however secured wide-spread adoption. The drawbacks inherent in them, such as increased weight, insufficient strength or the necessity of carrying out difficult and expensive preliminary treatment of the barrels, are too great a factor in the manufacture to enable them to displace the old-fashioned brazing.

The present invention replaces the brazing and the connection by mechanical means, by welding which does not allow injurious heating to spread to the barrel walls exposed to gas pressure. This is achieved by the projections intended to connect the barrels together, being welded together only at points "projecting" beyond the barrel wall, at a distance from the barrel walls, in order to protect the latter from injurious heating. The preliminary treatment of the barrels is simple, and a quick, and therefore cheap connection is made which also has a strength superior to that obtained by brazing. There is practically no greater difficulty in manufacturing the fire arm in this way, and the durability of the steel at the barrel walls exposed to gas pressure, is not affected.

The invention may be carried out in various ways, a number of constructions being illustrated in the accompanying drawing. The selection among the constructions according to the invention depends on the requirements with which the individual fire-arms have to comply. The leading common points of view according to which the welding joints are made, may be briefly summarized as follows:

First of all, separate welding projections may be provided on the barrels, or existing projections such as for instance the so-called pins, ribs and sighting bars may be utilized. If separate welding projections are adopted, they must be arranged symmetrically of the central plane of the "bundle" of barrels, and the projecting welding places are situated on projections which radiate from the apex of the angles formed by the adjoining barrels. In the case of barrels arranged side by side; each of the barrels may be provided with aligned welding projections which meet or overlap to form a bridge member overlying the space between the barrels.

When the projections are comparatively thick or when the welding is to take place close to the barrel wall, the projections may be reduced in thickness by milling aligned recesses in the same. If desired, a heat-insulating air gap may be provided between the barrel wall and the welding area. By providing welding areas of reduced thickness, and also by insulating those areas from the barrel, the welding operation may be performed in a minimum of time and without danger of damage to the barrel.

For a better understanding of the invention reference is had to the accompanying drawings in which, Figs. 1 to 7, inclusive, are vertical sections through various multiple-barrel guns in which the invention is embodied;

Fig. 8 is a fragmentary plan view of the construction shown in Fig. 7;

Fig. 9 and Fig. 10 are, respectively, a cross-section through and a fragmentary plan of a further embodiment of the invention; and Figs. 11 and 12 are fragmentary side elevations of further embodiments.

Figure 1 shows in cross-section the barrels $A^1$, $A^2$ of a sporting gun or rifle with superposed barrels. Both the upper barrel $A^1$ and the lower barrel $A^2$ are provided at either side with separate horizontal projecting welding projections $a$ which are welded only at $c$, preferably by electric point welding.

The welding places $c$ are at a considerable distance from the barrel walls so that the latter are not exposed to injurious heating.

Figure 2 shows in cross-section a three barrel gun with the barrels $A^1$, $A^2$, $A^3$, in which the welding places $c$, $c$ are situated on projections $a$, $a$ which radiate from the apex of the angles formed by adjoining barrels. The sighting bar $a^1$, $a^2$, is constituted, to the length required for the welding by barrel connecting projections which form a bridge member overlying the space between the upper barrels $A^1$, $A^2$.

Figure 3 shows in cross-section a double barreled gun or rifle having barrels $A^1$, $A^2$. The welding here is effected on the one hand at the sighting bar bridge $a^1$, $a^2$ at $c^1$, and at the usual barrel hook $f$ at $c^2$.

According to Figure 4, the two bridge halves $a^1$, $a^2$ are further extended round the circumference of the barrels, so as to form bottom bridges $a^3$, $a^4$ which surround the barrels $A^1$, $A^2$. The welding could be effected on butt or overlapping contact faces as indicated at $c^3$ and $c^4$.

Figure 5 shows in cross-section a "bock" rifle or gun like Figure 1, with barrels $A^1$, $A^2$. The welding projections $a$ are reduced in cross-section by milled recesses $e$, $e$ so that the welding places $c$ can be nearer to the barrel wall.

Figure 6 shows a three barrel gun such as Figure 2; in addition to the separate welding projections $a$, the sighting bar $a^1$, $a^2$ is utilized in this case for welding; its cross-section is reduced by milled recesses $e$, $e$.

According to Figures 7 and 8 which correspond to the constructions in Figures 1 and 2, the welding projections $a$ are formed by slots $b$ into bridges which extend parallel to the barrel walls unlike in Figures 2-4 in which the bridges extend at right angles to the barrel walls. The welding projections are here insulated from the barrel walls by means of the said air slots $b$ so that the welding places $c$ can be quite close to the barrel walls.

According to Figures 9 and 10, the sighting bar, like in Figure 6, is utilized as a welding projection; the projection places are separated from the barrel walls by slots $b^1$, $b^2$, moreover milled recesses $e$ $e$ are provided so that the welding can be made quite close to the barrel wall.

Figures 11 and 12 show the position of the welding joints along the stock.

According to Figure 11, the welding is done at the sighting bar $a^1$ and at the barrel hooks $f$ $f$ at $c$ $c$.

According to Figure 12, the welding is done also at the sighting bar $a^1$, $a^2$, and on separate bottom welding projections $a$ whilst the barrel hooks $f$, $f$ engage each other loosely.

Having now particularly described and ascertained the nature of my said invention and in what manner the same is to be performed, I declare that what I claim is:—

1. A fire arm with several barrels, characterized by the projections intended for the connection of the barrels being welded together only at places projecting beyond the barrel walls in order to protect the latter from injurious heating.

2. A fire arm as set forth in claim 1, characterized by the projecting welding places being situated on separate projections which are arranged symmetrically round the central plane of the bundle of barrels.

3. A fire arm as claimed in claim 1, wherein the said welding projections radiate from the apex of the angle formed by adjoining barrels.

4. A fire arm comprising a plurality of barrels, and projections extending from each of said barrels to bridge the space therebetween, said projections being welded together at points spaced from the said barrels.

5. A fire arm comprising a gun barrel, and a projection extending therefrom for securing the said barrel to another barrel, said projection being provided with a welding area spaced from said barrel and of reduced thickness.

6. A fire arm as set forth in claim 1 characterized by the welding projections being constituted by bridges extending parallel to the axis of the barrel and insulated from the barrel walls by means of air gaps.

7. A gun barrel of the type including a welding projection integral therewith, characterized by the fact that a portion of the projection is cut away adjacent the said barrel to provide heat insulation between the said barrel and the welding area of the said projection.

8. A fire arm of the type having a plurality of barrels secured to each other, characterized by the fact that the barrels are connected by means of flanges projecting from the several barrels and welded together at points spaced from the said barrels.

9. A fire arm comprising a plurality of barrels, a hook projection on one of said barrels and a connecting projection on each of said barrels, the adjacent connecting projections on adjoining barrels being welded to each other at points spaced from said barrels, at least one of said projections radiating from the apex of the angle formed by adjoining barrels.

10. A fire arm comprising a plurality of barrels, and flanges projecting from adjacent barrels and welded to each other, one set of said welded flanges radiating from the apex of the angle formed by adjoining barrels, and the flanges of another of said sets extending parallel to the axes of the said barrels and bridging the space therebetween.

In testimony whereof, I affix my signature.

KURT DIENER.